(12) United States Patent
Wang et al.

(10) Patent No.: US 12,269,574 B2
(45) Date of Patent: *Apr. 8, 2025

(54) METHODS FOR FORMING LIQUID FLOW PATHS ON A SURFACE OF A STRUCTURE

(71) Applicant: THE BOEING COMPANY, Chicago, IL (US)

(72) Inventors: Xiaoxi Wang, Mukilteo, WA (US); Thomas Seth Perkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 1175 days.

This patent is subject to a terminal disclaimer.

(21) Appl. No.: 16/787,115

(22) Filed: Feb. 11, 2020

(65) Prior Publication Data

US 2021/0245858 A1 Aug. 12, 2021

(51) Int. Cl.
*B64C 1/06* (2006.01)
*B32B 3/20* (2006.01)
*B64C 1/00* (2006.01)
*B64C 1/12* (2006.01)

(52) U.S. Cl.
CPC ............... *B64C 1/067* (2013.01); *B32B 3/20* (2013.01); *B64C 2001/0072* (2013.01); *B64C 1/12* (2013.01)

(58) Field of Classification Search
CPC .... B64C 1/067; B64C 1/12; B64C 2001/0072
See application file for complete search history.

(56) References Cited

U.S. PATENT DOCUMENTS

| | | | |
|---|---|---|---|
| 3,631,923 A | 1/1972 | Izeki | |
| 3,837,396 A | 9/1974 | Newton | |
| 5,827,598 A | 10/1998 | Larsen | |
| 5,897,079 A | 4/1999 | Specht | |
| 7,051,793 B1 | 5/2006 | Schulz-Harder | |
| 7,083,147 B2 | 8/2006 | Movsesian | |
| 8,722,143 B2* | 5/2014 | Werner | B05D 5/08 427/248.1 |
| 9,139,739 B2* | 9/2015 | Megaridis | C09D 5/00 |
| 9,551,538 B2 | 1/2017 | Honmura | |
| 10,421,072 B2* | 9/2019 | Megaridis | B01L 3/50273 |
| 10,907,258 B1* | 2/2021 | Kota | C23F 1/20 |

(Continued)

FOREIGN PATENT DOCUMENTS

| | | |
|---|---|---|
| CN | 103221771 | 7/2013 |
| CN | 106232696 | 12/2016 |

(Continued)

OTHER PUBLICATIONS

Qualitech LTD, "What is Photo-Etching," Jul. 6, 2024, accessed Aug. 11, 2024.

(Continued)

*Primary Examiner* — Kimberly S Berona
*Assistant Examiner* — Michael A Fabula
(74) *Attorney, Agent, or Firm* — Joseph M. Butscher; The Small Patent Law Group LLC (57) ABSTRACT

A method includes providing a structure having a surface, treating a portion of the surface to modify a wettability of the portion of the structure, and forming at least one liquid flow path on the surface through said treating.

20 Claims, 3 Drawing Sheets

(56) References Cited

U.S. PATENT DOCUMENTS

| | | |
|---|---|---|
| 10,988,230 B2 | 4/2021 | Richardson |
| 11,155,035 B2 | 10/2021 | Miller et al. |
| 2004/0000165 A1 | 1/2004 | Max |
| 2006/0068109 A1 | 3/2006 | Frankenberger |
| 2007/0146998 A1 | 6/2007 | Sarno |
| 2007/0231559 A1* | 10/2007 | Kim ................. G01N 33/54393 427/337 |
| 2008/0070998 A1* | 3/2008 | Takada ...................... C08J 9/04 521/50.5 |
| 2009/0269837 A1 | 10/2009 | Shevkoplyas |
| 2010/0143741 A1* | 6/2010 | Bell ...................... C23C 28/025 524/439 |
| 2010/0210745 A1 | 8/2010 | McDaniel |
| 2012/0295093 A1* | 11/2012 | Belpaire ................. B29C 44/18 428/411.1 |
| 2013/0168057 A1 | 7/2013 | Semenic |
| 2014/0017457 A1* | 1/2014 | Megaridis ............ C09D 5/1675 428/447 |
| 2015/0108272 A1 | 4/2015 | Picot |
| 2016/0195072 A1 | 7/2016 | Macaraeg |
| 2017/0106965 A1* | 4/2017 | Dickson ................. B64C 1/066 |
| 2017/0113776 A1* | 4/2017 | Johnson ................. G01K 13/00 |
| 2018/0194917 A1 | 7/2018 | Dikeman |
| 2020/0165461 A1* | 5/2020 | Brockway ............... C30B 29/16 |
| 2020/0181458 A1* | 6/2020 | Lei .............................. C09J 7/30 |
| 2021/0114266 A1* | 4/2021 | Di Maio .................... C08J 9/34 |
| 2021/0138734 A1* | 5/2021 | Maben ................. B29C 64/118 |
| 2021/0245859 A1* | 8/2021 | Perkins ..................... B64C 1/12 |

FOREIGN PATENT DOCUMENTS

| | | |
|---|---|---|
| CN | 108431109 | 8/2018 |
| EP | 0435650 | 7/1991 |
| EP | 2805811 | 11/2014 |
| EP | 2982599 | 2/2016 |
| EP | 3395672 | 10/2018 |
| EP | 3693270 | 8/2020 |
| KR | 20110075241 | 7/2011 |
| WO | WO 2009/127460 | 10/2009 |
| WO | WO 2010/123771 | 10/2010 |

OTHER PUBLICATIONS

English translation of First Ntofocation of Office Action for CN202110187575.9, dated Dec. 16, 2024.

Extended European Search Report for EP24192035.4, dated Jan. 15, 2025.

* cited by examiner

METHODS FOR FORMING LIQUID FLOW PATHS ON A SURFACE OF A STRUCTURE

FIELD OF EMBODIMENTS OF THE DISCLOSURE

Embodiments of the present disclosure generally relate to liquid management methods, and more particularly, to methods for forming liquid flow paths on a surface of a structure.

BACKGROUND OF THE DISCLOSURE

As an airplane is operated, condensation may occur during various phases of flight. During aircraft design and manufacture, special consideration is given with respect to the potential of moisture within the airplane, so as to ensure that corrosion of various internal structures, short-circuiting, arcing, and/or degradation of electrical components, and the like, does not occur. In general, condensation is directly related to environmental conditions within an internal cabin of the airplane, and indirectly related to ambient conditions outside of the airplane when grounded. Passengers, crew, onboard meals, and onboard beverages may contribute to condensation within an airplane.

Water accumulation due to condensation occurs in both short and long range flights, but is generally more excessive in continuous long-range flights over six hours having quick turn-around departures. Accordingly, various systems and methods have been developed to control and manage condensation within an airplane.

Many airplanes include various moisture management devices to minimize or otherwise reduce moisture within an internal cabin. For example, drains, moisture impermeable insulation blankets, zonal air dryers (such as dehumidifiers), humidity control systems, and other such moisture management devices are used to capture and/or direct moisture away from an internal cabin interior and divert the moisture to a bilge, through which the moisture drains overboard via pressure valves.

As can be appreciated, however, the various moisture management devices add weight and cost to an airplane. Further, installing the various moisture management devices increases manufacturing time.

Also, during installation, absorbent moisture management devices may be compressively rolled or stacked in relation to other aircraft components. As the moisture management device is compressed, internal absorbing space within the moisture management device is also compressed, which may reduce the ability of the moisture management device to absorb and retain moisture. Therefore, as the moisture management device is compressed, its effectiveness may decrease.

SUMMARY OF THE DISCLOSURE

A need exists for efficient moisture management within an aircraft. Further, a need exists for an efficient method of forming structures that are configured to manage moisture.

With those needs in mind, certain embodiments of the present disclosure provide a method including providing a structure having a surface, treating a portion of the surface to modify a wettability of the portion of the structure, and forming at least one liquid flow path on the surface through said treating.

In at least one embodiment, said treating includes treating the portion that forms the at least one liquid flow path. In at least one other embodiment, said treating includes treating the portion that forms one or more banks adjacent to the at least one liquid flow path.

In at least one embodiment, said treating includes providing the portion of the surface with a first wettability that differs from a second wettability of a remainder of the surface. As an example, the first wettability allows for increased flow of liquid in comparison to the second wettability. As another example, the first wettability allows for decreased flow of liquid in comparison to the second wettability.

The structure can include a panel. The structure can be formed of a thermoplastic or thermoset, for example. The structure can be formed of nylon, polycarbonate (PC), polypheylsulfone (PPSU), polyetherimide (PEI), or phenolic-epoxy based resin, for example.

In at least one embodiment, said treating includes texturing the portion. In at least one embodiment, said treating includes printing on the portion. In at least one embodiment, said treating includes chemically etching the portion. In at least one embodiment, said treating includes superficial foaming the portion.

Certain embodiments of the present disclosure provide a method including providing a panel having a surface, and treating a portion of the surface to modify a wettability of the portion of the structure. Said treating includes providing the portion of the surface with a first wettability that differs from a second wettability of a remainder of the surface. In at least one embodiment, the method also includes forming at least one liquid flow path on the surface through said treating.

In at least one embodiment, said treating includes treating the portion that forms at least one liquid flow path. In at least one other embodiment, said treating includes treating the portion that forms one or more banks adjacent to at least one liquid flow path.

In at least one embodiment, the first wettability allows for increased flow of liquid in comparison to the second wettability. In at least one other embodiment, the first wettability allows for decreased flow of liquid in comparison to the second wettability.

In at least one embodiment, said treating includes one or more of texturing the portion, printing on the portion, chemically etching the portion, and/or superficial foaming the portion.

DETAILED DESCRIPTION OF THE DISCLOSURE

The foregoing summary, as well as the following detailed description of certain embodiments, will be better understood when read in conjunction with the appended drawings.

As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide methods of forming liquid flow paths on a surface of a structure. The liquid flow paths divert liquid to designated locations, such as a drain, bilge, or the like. The structure having the liquid flow paths can be used in various settings, such as within a vehicle (such as an aircraft, automobile, train car, watercraft, or the like), a building (such as a residential or commercial property), and/or various articles of manufacture.

Certain embodiments of the present disclosure provide a method including providing a structure having an outer surface, and modifying the outer surface through surface treatment. In at least one embodiment, the modifying includes forming one or more liquid flow paths having a first wettability that differs from other portions of the structure. For example, the liquid flow paths are between banks having a second wettability that differs from the first wettability. The first wettability provides increased liquid flow in comparison to the second wettability. Accordingly, liquid flows over the liquid flow paths. In this manner, the structure is formed having liquid flow paths, such as through surface treatment. The liquid flow paths are configured to direct liquid to a desired location, such as to a drain, bilge, or the like.

Embodiments of the present disclosure provide structures that are configured to reduce condensation, such as within an aircraft, vehicle, building, or the like. Further, embodiments of the present disclosure provide structures that route liquid to desired locations without increasing weight (in contrast to separate and distinct moisture control devices) to a system.

Figure 1:
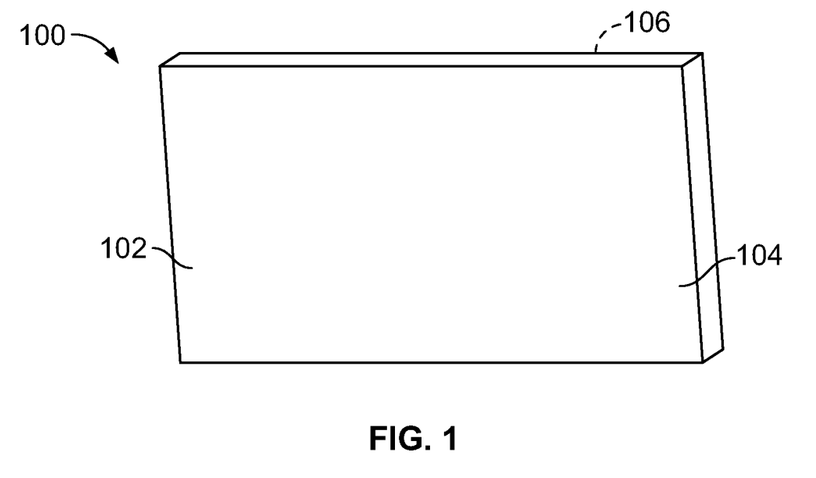
FIG. 1 illustrates a perspective front view of a structure, according to an embodiment of the present disclosure.

FIG. 1 illustrates a perspective front view of a structure 100, according to an embodiment of the present disclosure. In at least one embodiment, the structure 100 is a panel, sheet, or the like. In at least one other embodiment, the structure 100 is a block, sphere, pyramid, irregularly-shaped structure, or the like.

As shown, the structure 100 can be a flat sheet of material. Optionally, the structure 100 can include one or more curved surfaces.

The structure 100 includes a first face 102 having an exposed surface 104. The first face 102 is coupled to a second face 106 opposite from the first face 102. The first face 102 can be a front, rear, top, bottom, lateral, or other such face. The surface 104 is an outer surface of the structure 100.

The structure 100 is formed of a material, such as a plastic, metal, composite, and/or the like. For example, the structure 100 can be formed of a thermoplastic, such as nylon, polycarbonate (PC), polypheylsulfone (PPSU), polyetherimide (PEI), or the like. As another example, the structure 100 can be formed of epoxy, phenolic materials, and/or the like.

Figure 2:
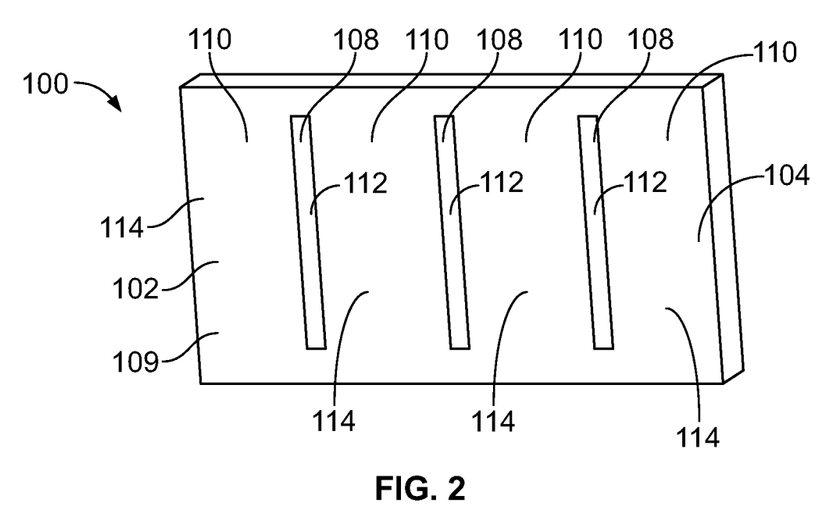
FIG. 2 illustrates a perspective front view of the structure having liquid flow paths formed through surface treatment, according to an embodiment of the present disclosure.

FIG. 2 illustrates a perspective front view of the structure 100 having liquid flow paths 108 formed through surface treatment, according to an embodiment of the present disclosure. The liquid flow paths 108 are formed on a main body 109, such as between banks 110. The liquid flow paths 108 have a first wettability 112 that differs from a second wettability 114 of the remainder of the main body 109, such as the banks 110. The first wettability 112 provides increased liquid flow rate as compared to the second wettability 114. As such, the first wettability 112 of the liquid flow paths 108 allows for liquid to flow with increased ease as compared to the banks 110. In this manner, the liquid flow paths 108 are configured to divert liquid, such as water, to a desired location, such as a bilge, drain, or the like, such as via gravity.

Liquid can flow on the banks 110. However, the banks 110 resist liquid flow greater than the liquid flow paths 108. During a flight of an aircraft, structures within an aircraft may vibrate. Due to gravity and vibration during a flight, liquid gathers and flows along the liquid flow paths 108. In at least one embodiment, boundaries between treated and untreated areas provide the banks 110.

It is to be understood that first and second in relation to wettability are merely terms used to differentiate. That is, the first wettability differs from the second wettability. The liquid flow paths 108 have increased wettability in comparison to the remainder of the main body 109 of the structure 100, such as that of the banks 110. It is to be understood that the first wettability is not necessarily one of increased wettability. For example, the liquid flow paths 108 may have a second wettability that is increased in relation to a first wettability of the banks 110.

The structure 100 can include more or less liquid flow paths 108 than shown. Further, the liquid flow paths 108 can be sized and shaped differently than shown. For example, the liquid flow paths 108 can be horizontally or diagonally oriented, instead of vertically oriented. As another example, the liquid flow paths 108 can include one or more curved portions, instead of being linear.

The wettability of a surface relates to surface tension or surface energy of a liquid, such as water. Wettability relates to surface flow resistance. As an example, increasing wettability of a surface increases a likelihood that the liquid flows over the surface, in contrast to beading up on the surface. Conversely, decreasing wettability of a surface increases a likelihood that the liquid will bead on the surface, as opposed to flowing over the surface. As another example, increasing the surface flow resistance of a surface decreases a likelihood that liquid flows over the surface, in contrast to beading up on the surface. Conversely, decreasing the surface flow resistance of a surface decreases a likelihood that the liquid will bead on the surface, as opposed to flow over the surface. For example, a bank 110 has a higher surface flow resistance than a liquid flow path 108.

Figure 3:
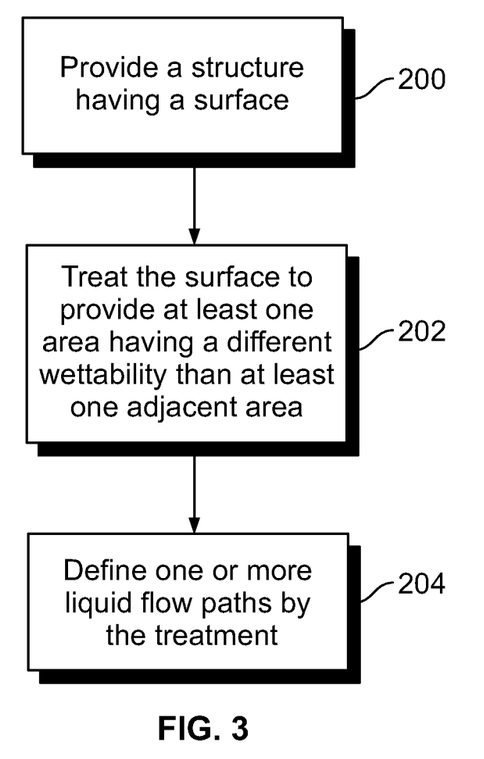
FIG. 3 illustrates a flow chart of a method of forming one or more liquid flow paths on a surface of a structure, according to an embodiment of the present disclosure.

FIG. 3 illustrates a flow chart of a method of forming one or more liquid flow paths on a surface of a structure, according to an embodiment of the present disclosure. Referring to FIGS. 103, at 200, the structure 100 having the surface 104 is provided. At 202, the surface 104 is treated to provide at least one area having a different wettability than at least one area that is adjacent to the at least one area. The at least one area provides at least one liquid flow path 108, while the at least one area that is adjacent to the at least one area can be or include one or more banks 110. Accordingly, at 204, the one or more liquid flow paths 108 are defined by the treatment of the surface 104.

The surface treatment of 202 can be performed through a variety of surface treatment processes. For example, the structure 100 can be formed of a thermoplastic or thermoset, such as an epoxy or phenolic material. The treatment can be via an in-mold texturing, printing, bonding or cutting, chemical etching, painting using a blocking layer, and/or the like. As another example, the structure 100 can be nylon, PC, PPSU, PEI, or the like, and the treatment can be via superficial foaming, bonding, texturing, chemical etching, or the like. The treatment modifies at least a portion of the surface 104 to define one or more liquid flow paths 108 having a different wettability than a remainder of the main body 109, such as the banks 110.

Treating a portion of the surface 104 of the structure 100 to form one or more liquid flow paths 108 can include texturing the portion to modify a wettability of the portion. As another example, treating the portion can include printing on the portion, such through three-dimensional printing, ink printing, laser printing, and/or the like, to modify a wettability of the portion. As another example, the treating can include chemically etching the portion to modify a wettability of the portion. As another example, the treating can include superficial foaming the portion to modify a wettability of the portion. In at least one embodiment, the treating can include one or more of texturing the portion to modify a wettability of the portion, printing on the portion, chemically etching the portion to modify a wettability of the portion, and/or superficial foaming the portion to modify a wettability of the portion.

In at least one embodiment, the treatment of the surface 104 is via superficial foaming. For example, in the case of a thermoplastic surface, a physical foaming agent (such as high pressure carbon dioxide gas or supercritical carbon dioxide) can be applied to the localized area on surface 104, such as at areas that are to be the liquid flow paths 108. In the saturation process, the physical foaming agent can be allowed to remain on the surface 104 for a predetermined period of time to diffuse into the area for a certain depth, such as ten minutes (optionally, the time period can be more or less than ten minutes, such as twenty minutes, or five minutes). The physical foaming agent is then removed, and the structure 100 can then be heated leading to superficial foaming, which thereby modifies the areas to a certain depth. In this manner, superficial foaming modifies a wettability of areas of the structure. Further, during the saturation process, an area to be treated may be sealed locally to maintain a high pressure gas state or supercritical state for the physical foaming agent.

Figure 4:
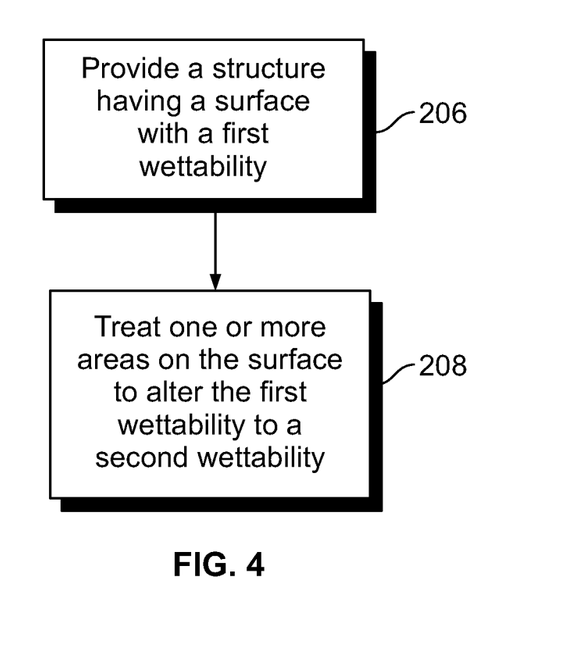
FIG. 4 illustrates a flow chart of a method of forming one or more liquid flow paths on a surface of a structure, according to an embodiment of the present disclosure.

FIG. 4 illustrates a flow chart of a method of forming one or more liquid flow paths on a surface of a structure, according to an embodiment of the present disclosure. Referring to FIGS. 1, 2, and 4, at 206, the structure 100 having the surface 104 with a first wettability is provided. As an example, the first wettability can be one in which water beads on the surface. As such, the first wettability can be a relatively low wettability in that water beads thereon, instead of flowing over the surface 104. Next, at 208, one or more areas are treated on the surface to alter the first wettability to a second wettability. The treatment can include superficial foaming, chemical etching, painting, printing, or the like. In at least one embodiment, the one or more areas are desired locations for the liquid flow paths 108. As such, the second wettability is greater than the first wettability. That is, the second wettability allows for increased liquid flow, and decreased liquid beading.

As another example, the first wettability can be one in which water tends to flow over, as opposed to bead. As such, the first wettability can be a relatively high wettability. In this embodiment, areas on the surface 104 are treated to alter the first wettability to a second wettability that is less than the first wettability. As such, the areas that are formed through surface treatment can be those that are desired to be the banks 110. The liquid flow paths 108 are formed between the banks 110.

As described herein, embodiments of the present disclosure provide a method of forming one or more liquid flow paths on a surface of a structure. The method includes providing the structure, and treating at least a portion of the surface of the structure to alter or otherwise modify a wettability thereof. The treating defines the liquid flow paths. A first wettability of the portion of the surface differs from a second wettability of a remainder of the surface. In at least one embodiment, the first wettability allows for increased flow of liquid in comparison to the second wettability. In at least one other embodiment, the first wettability allows for decreased flow of liquid as compared to the second wettability.

In at least one embodiment, the treating increases the wettability, thereby providing the liquid flow paths at the locations of treatment (for example, at the portion(s) where treated). In at least one other embodiment, the treating decreases the wettability, thereby providing the liquid flow paths at locations other than the locations of the treatment (for example, at areas other than portion(s) where treated).

Figure 5:
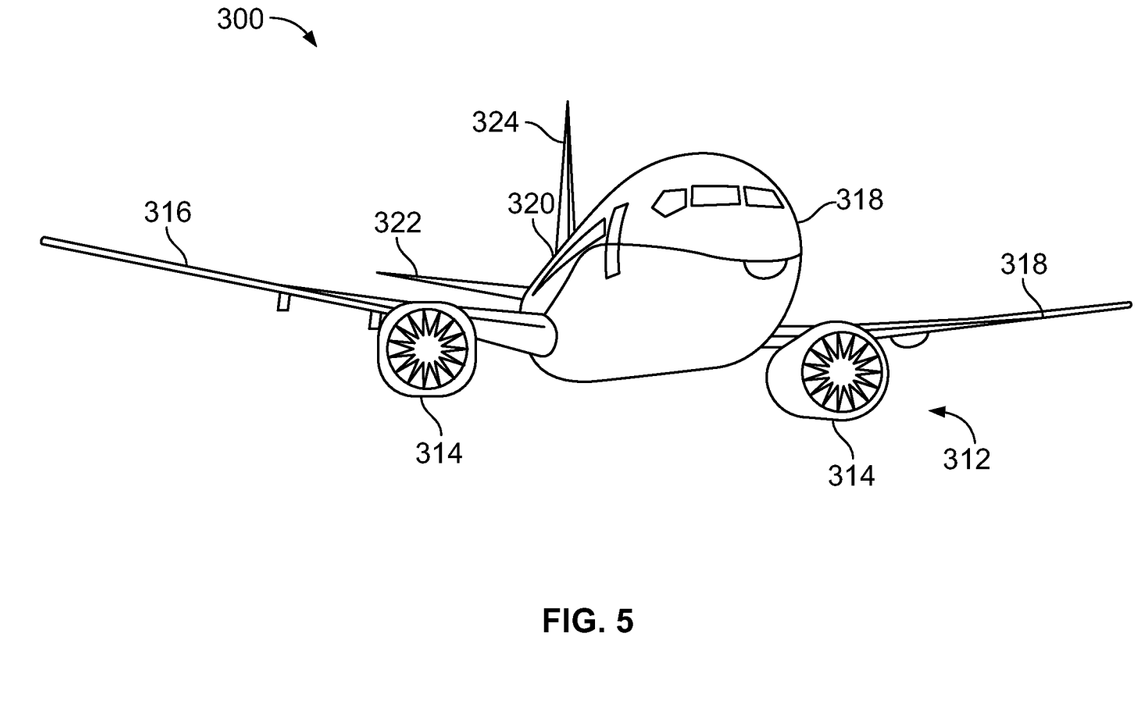
FIG. 5 illustrates a perspective front view of an aircraft, according to an embodiment of the present disclosure.

FIG. 5 illustrates a perspective front view of an aircraft 300, according to an embodiment of the present disclosure. The aircraft 300 includes a propulsion system 312 that may include two turbofan engines 314, for example. Optionally, the propulsion system 312 may include more engines 314 than shown. The engines 314 are carried by wings 316 of the aircraft 300. In other embodiments, the engines 314 may be carried by a fuselage 318 and/or an empennage 320. The empennage 320 may also support horizontal stabilizers 322 and a vertical stabilizer 324.

The fuselage 318 of the aircraft 300 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section. Portions of the aircraft 300, such as panels within the internal cabin, can be formed by methods to form liquid flow paths, as described herein.

Optionally, instead of an aircraft, embodiments of the present disclosure may be used with various other vehicles, such as automobiles, buses, locomotives and train cars, watercraft, spacecraft, and the like. As another example, embodiments of the present disclosure can be used to form structures having liquid flow paths for structures within buildings, articles of manufacture, or the like.

As described herein, embodiments of the present disclosure provide methods of forming structures that are configured to efficiently manage moisture, such as within an aircraft, for example. The structures include liquid flow paths that are formed through surface treatment. Embodiments of the present disclosure provide lightweight and cost-effective structures that are integrally formed with liquid flow paths. As such, weight for a system can be reduced as there is a reduced need for separate and distinct moisture management devices. Instead, the structures that form portions of a system, such as an aircraft, are integrally formed with their own liquid flow paths that divert moisture to desired locations.

Certain embodiments of the present disclosure provide a structure, such as a panel, sheet, or the like. The structure has a surface, such as an exposed outer surface. A portion of the surface is treated to modify a wettability of the portion of the structure. At least one liquid flow path is formed on the surface through the treated portion.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:
   providing a structure having a surface;
   treating a portion of the surface to modify a wettability of the portion of the structure, wherein said treating comprises superficial foam the portion; and
   forming at least one liquid flow path on the surface through said treating.

2. The method of claim 1, wherein said treating comprises treating the portion to form the at least one liquid flow path.

3. The method of claim 1, wherein said treating comprises treating the portion to form one or more banks adjacent to the at least one liquid flow path.

4. The method of claim 1, wherein said treating comprises providing the portion of the surface with a first wettability that differs from a second wettability of a remainder of the surface.

5. The method of claim 4, wherein the first wettability allows for increased flow of liquid in comparison to the second wettability.

6. The method of claim 4, wherein the first wettability allows for decreased flow of liquid in comparison to the second wettability.

7. The method of claim 1, wherein the structure comprises a panel.

8. The method of claim 1, wherein the structure is formed of a thermoplastic or a thermoset.

9. The method of claim 1, wherein the structure is formed of one of nylon, polycarbonate (PC), polypheylsulfone (PPSU), polyetherimide (PEI), or epoxy.

10. The method of claim 1, wherein said treating further comprises texturing the portion.

11. The method of claim 1, wherein said treating further comprises said printing on the portion.

12. The method of claim 1, wherein said treating further comprises said chemically etching the portion.

13. The method of claim 1,
    wherein said superficial foaming comprises:
        applying a physical foaming agent to a localized area on the portion;
        allowing the physical foaming agent to remain on the portion for a predetermined period of time to diffuse into the portion;
        removing the physical foaming agent after said allowing; and
        heating the structure after said removing.

14. A method comprising:
    providing a panel having a surface; and
    treating a portion of the surface to modify a wettability of the portion of the structure, wherein said treating comprises providing the portion of the surface with a first wettability that c differs from a second wettability of a remainder of the surface, wherein said treating includes superficial foaming the portion.

15. The method of claim 14, further comprising forming at least one liquid flow path on the surface through said treating.

16. The method of claim 14, wherein said treating comprises treating the portion to form at least one liquid flow path.

17. The method of claim 14, wherein said treating comprises treating the portion to form one or more banks adjacent to at least one liquid flow path.

18. The method of claim 14, wherein the first wettability allows for increased flow of liquid in comparison to the second wettability.

19. The method of claim 14, wherein the first wettability allows for decreased flow of liquid in comparison to the second wettability.

20. The method of claim 14, wherein said superficial foaming comprises:
    applying a physical foaming agent to a localized area on the portion;

allowing the physical foaming agent to remain on the portion for a predetermined period of time to diffuse into the portion;
removing the physical foaming agent after said allowing; and
heating the structure after said removing.

* * * * *

UNITED STATES PATENT AND TRADEMARK OFFICE
CERTIFICATE OF CORRECTION

PATENT NO. : 12,269,574 B2  
APPLICATION NO. : 16/787115  
DATED : April 8, 2025  
INVENTOR(S) : Xiaoxi Wang et al.

Page 1 of 1

It is certified that error appears in the above-identified patent and that said Letters Patent is hereby corrected as shown below:

In the Claims

In Claim 1 at Column 7, Line 65 the portion reading "said treating comprises superficial foam the portion" should read --"said treating comprises superficial foaming the portion"--

Signed and Sealed this  
Sixth Day of May, 2025

Coke Morgan Stewart  
*Acting Director of the United States Patent and Trademark Office*